UNITED STATES PATENT OFFICE.

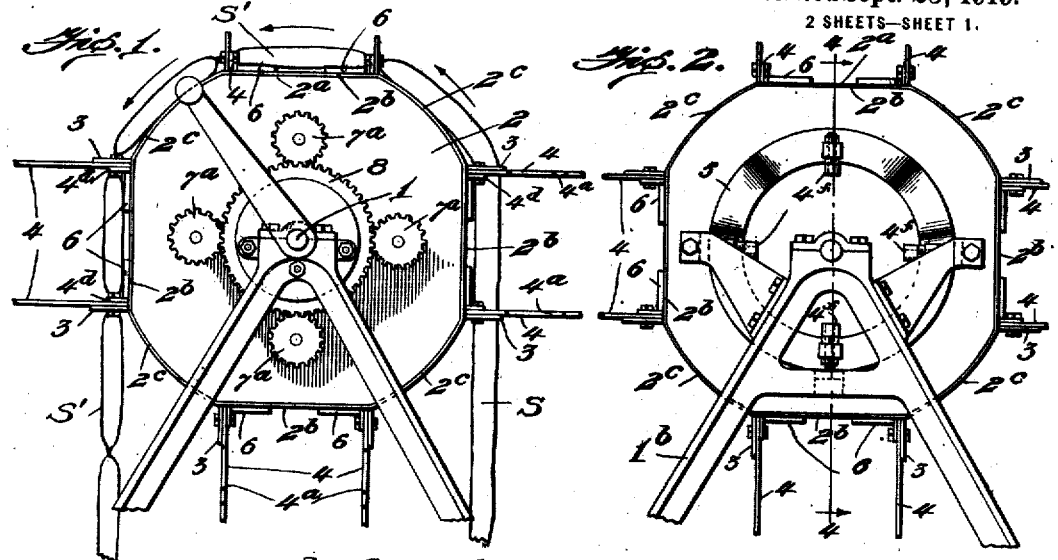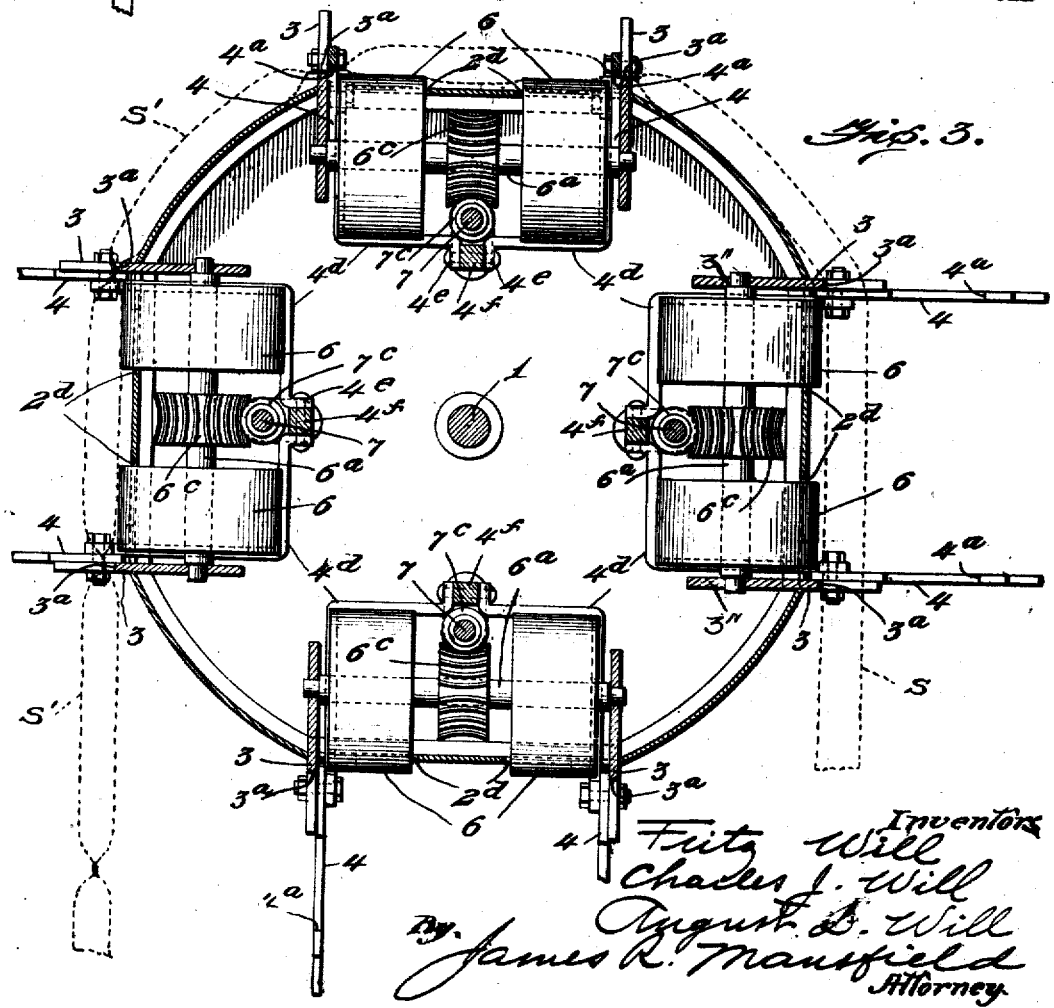

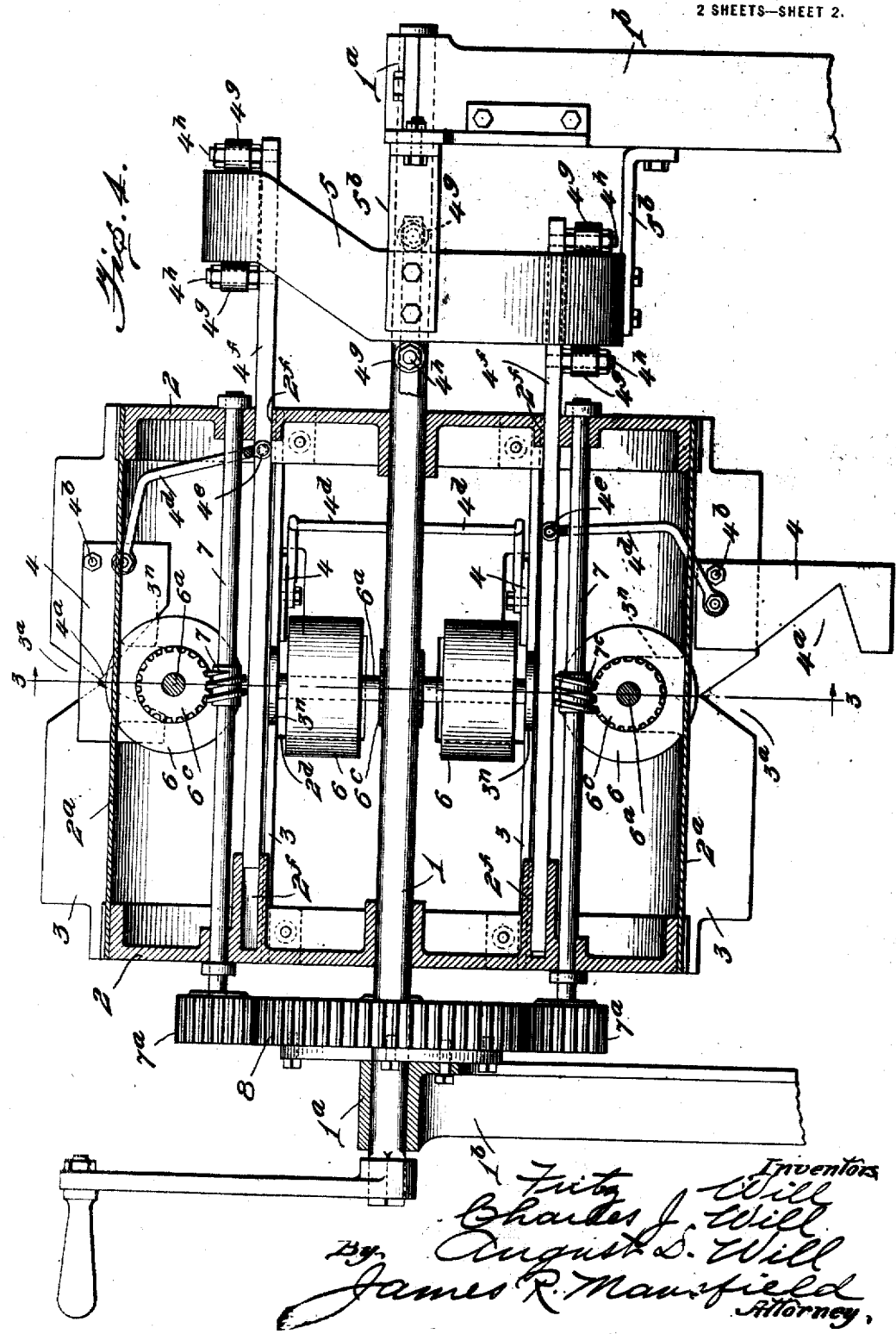

FRITZ WILL, AUGUST D. WILL, AND CHARLES J. WILL, OF ALTON, ILLINOIS.

SAUSAGE-LINKING MACHINE.

1,316,752.

Specification of Letters Patent.   Patented Sept. 23, 1919.

Application filed January 6, 1919.   Serial No. 269,901.

*To all whom it may concern:*

Be it known that we, FRITZ WILL, AUGUST D. WILL, and CHARLES J. WILL, citizens of the United States, residing at Alton, in the county of Madison and State of Illinois, have invented certain new and useful Improvements in Sausage-Linking Machines, of which the following is a specification.

Our invention is an improved machine for twisting casings filled with sausage to form the same into links.

The object of the invention is to produce a machine which will rapidly link the sausage, make the links of uniform length, be simple in construction, light running, capable of rapid efficient operation, and satisfactory in results.

We will explain the invention with reference to the accompanying drawings, which illustrate one practical embodiment thereof, and summarize in the claims the essential features of the invention and novel combinations of parts for which protection is desired.

In said drawings:

Figure 1 is an end elevation of the complete machine.

Fig. 2 is a view of the opposite end thereof.

Fig. 3 is a transverse section on the line 3—3, Fig. 4.

Fig. 4 is a longitudinal section through the machine on the line 4—4, Fig. 2.

The machine, as shown in the drawings, has a central supporting shaft 1, which may be mounted in bearings 1ª on standards 1ᵇ, which may be attached to any suitable base or support.

Mounted upon this shaft 1 between the bearings is a drum composed of opposite end plates or heads 2 and a casing or shell 2ª. The heads 2 are preferably polygonal in shape and as shown have four flat facets and four curved facets. The casing 2ª is fastened to and between the heads 2 and has four approximately flat facets 2ᵇ and four intermediate curved facets 2ᶜ; the drum, as shown, having eight sides or facets, but this number may be varied.

Attached to the heads and extending longitudinally of the drum at the sides of each facet are metal bars 3 each of which has a preferably V-shaped notch 3ª at its center, the apex of this notch coming adjacent the exterior surface of the drum. The several facets are of substantially equal width so that the bars 3 are approximately equi-distant.

Pivotally connected to each bar 3 is a pinching plate 4 which is also provided with a preferably V-shaped notch 4ª arranged to come opposite the notch 3ª, and adapted to co-act therewith in pinching the stuffed sausage casing and contracting the same into desired lengths.

Each pinching plate 4 is preferably pivoted to the related bar 3 at one side of notch 3ª by a bolt, or other suitable means, as indicated at 4ᵇ, and each pinching plate is pivotally connected adjacent its pivot 4ᵇ to one end of a bent link 4ᵈ, the other end of which link is pivotally connected at 4ᵉ to an actuating bar 4ᶠ which is slidably mounted in guides 2ᶠ, attached to the heads 2, or in other suitable manner within the drum.

Each bar 4ᶠ projects outside of the drum at one end and into and through a cam ring 5, which ring is fixedly supported, circumferentially of the shaft 1, by means of bracket arms 5ᵇ connected to the cam ring and to the standards 1ᵇ or other suitable support so that the cam ring is non-rotatable, while the bars 4ᶠ will move orbitally around the shaft 1 as the drum rotates, and the ends of the bars 4ᶠ travel around and within the cam ring 5.

Each bar 4ᶠ is provided with rollers 4ᵍ mounted on standards 4ʰ attached to the bar at opposite sides of the cam ring 5, and as the drum is rotated said rollers engaging opposite edges of the cam ring 5 will cause the bars 4ᶠ to reciprocate; and through the connecting links 4ᵈ cause the several pinching plates 4 to swing open and remain open for and during part of the rotation of the drum, and then to close upon the sausage casing and remain closed during the remainder of the rotation of the drum, for purposes hereinafter explained.

In the example shown there are four slide bars 4ᶠ, one arranged intermediate each pair of bars 3 and each bar 4ᶠ is connected with and operates two of the adjacent pinching plates 4. In the flat facets 2ª of the drum, and in circumferential alinement with the notches 3ª in the bar 3, are openings 2ᵈ adjacent the notches in the bars, and through these openings project the peripheries of transversely disposed rollers 6, which are mounted upon transversely disposed shafts 6ª journaled in suitable bearings in the drum, and being shown as journaled in inwardly projecting lugs 3ⁿ on the adjacent bars 3.

On each shaft 6ᵃ is a preferably spiral or worm gear 6ᵉ which meshes with an opposed worm 7ᵉ on a related shaft 7 suitably mounted in the drum, and shown as journaled in the heads 2. Each shaft 7 extends outwardly through the head 2 of the drum at the end opposite the cam 5; and on the outer end of each shaft 7 is a pinion 7ᵃ which meshes with a large gear 8 that is non-rotatably fastened to the adjacent standard 1ᵇ or other suitable support.

The drum may be turned by a crank on one end of shaft 1, or by any other suitable means. As the drum is rotated the rollers 6 are rapidly turned by the gearing between said rollers and the gear 8, which gearing should be proportioned to impart the desired speed of rotation to the rollers 6; the pinions 7ᵃ meshing with and revolving around gear 8 are driven thereby as the drum is rotated.

During the rotation of the drum the bars 4ᶠ are reciprocated by their engagement with the cam 5, and said cam is so shaped as to cause the bars 4ᶠ to move links 4ᵈ and cause pinching plates 4 to swing open after reaching the descending side of the drum (which rotates in the direction indicated by arrows in Fig. 1), and to close upon the stuffed casing after they reach the ascending side of the drum (see Figs. 1 and 3).

In starting the machine the end of the stuffed sausage casing S is held in position to be engaged by one of the closing pinching plates 4 at the ascending side of the drum; and as the drum is rotated the sausage casing is drawn around and over the drum and lies within the open notches 3ᵃ of bars 3. As the drum rotates the pinching plates 4 are successively closed upon the sausage casing at the ascending side of the machine and pinch this casing into link form as indicated at S′ in Figs. 1 and 3, and the sausage links held in contact with the adjacent rollers 6 are rapidly rotated on their longitudinal axes, thus spinning or twisting the links at the points where they are pinched so that the sausage casing is formed into a series of similar links, as indicated, as is desirable for marketing.

In the machine shown the drum has eight facets, and there are eight pinching bars, four sets of pinching plates, four sets of twisting rollers and four cam shafts; but the number of facets and sets of pinching plates, and twisting rollers, etc., can be varied according to the desired size and capacity of the machine. It will also be possible to increase the capacity of the machine by lengthening the same and making additional notches in the bars 3 and providing additional pinching plates and sets of twisting rollers so that more than one stuffed sausage casing could be simultaneously operated upon.

What we claim is:

1. In a machine for linking stuffed sausage casings, the combination of a drum, pinching members attached to the drum, movable pinching members coacting therewith, slidable bars extending outside the drum, a cam ring engaging the said bars, connections between said bars and the movable pinching members; rollers mounted between adjacent pairs of pinching members, and adapted to engage the sausage links and twist same; shafts journaled in the drum and extending outside thereof, a gear outside the drum, gearing between the said shafts and said rollers, and gearing between said shafts and the outside gear, substantially as described.

2. In a machine for linking stuffed sausage casings, the combination of a rotatable drum, pinching members attached thereto, movable pinching members coacting therewith, slidable bars mounted in the drum and extending outside one end thereof, a cam ring engaging the projecting ends of said bars, connections between said bars and the movable pinching members; rollers mounted between adjacent sets of pinching members, and adapted to engage the sausage links and twist same; shafts extending outside the drum opposite the cam ring, a fixed gear outside the drum, gearing between the said shafts and said rollers, and gearing between said shafts and the fixed gear, substantially as described.

3. In a machine for linking stuffed sausage casings, the combination of a drum, notched pinching bars attached to the drum, movable pinching plates coacting therewith, slidable bars extending outside the drum, a cam ring engaging the said bars and connections between said bars and the pinching plates; with means adapted to engage the sausage links and twist same.

4. In a machine for linking stuffed sausage casings, the combination of a drum, notched pinching bars attached to the drum, movable pinching plates coacting therewith, slidable bars extending outside the drum, a cam ring engaging the said bars and connections between said bars and the pinching plates; with rollers mounted between adjacent pairs of pinching members, and adapted to engage the sausage links and twist same; shafts journaled in the drum and extending outside thereof, a gear outside the drum, gearing between the said shafts and said rollers, and gearing between said shafts and the outside gear, substantially as described.

5. In a machine for linking stuffed sausage casings, the combination of a rotatable drum having a series of flat facets, pinching members attached to the drum at opposite sides of the flat facets, pinching plates coacting with the pinching members, means for operating said plates extending outside the drum, a cam ring engaging the said means, and means intermediate adjacent sets of pinching members adapted to engage the sausage links and twist same, substantially as described.

6. In a machine for linking stuffed sausage casings, the combination of a rotatable drum having a series of flat facets, pinching members attached to the drum at opposite sides of the flat facets, pinching plates coacting with the pinching members; slidable bars mounted in the drum and extending outside one end thereof, a cam ring engaging the projecting ends of said bars, connections between said bars and the movable pinching members; means mounted between adjacent sets of pinching members, and adapted to engage the sausage links and twist same; shafts extending outside the drum opposite the cam ring, a fixed gear outside the drum, gearing between the said shafts and said twisting means, and gearing between said shafts and the fixed gear, substantially as described.

7. In a machine for linking stuffed sausage casings, the combination of a rotatable drum, pinch-bars attached to the periphery of the drum, pinch plates coacting therewith; slidable bars mounted in the drum and extending outside thereof, a fixed cam ring engaging the projecting ends of said bars, link connections between said bars and the pivoted pinch plates; rollers mounted between the notched bars and adapted to engage the sausage links and twist same; shafts journaled in the drum and extending outside thereof, a fixed gear outside the drum, gearing between the said shafts and said rollers, and gearing between said shafts and the fixed gear, substantially as described.

8. In a machine for linking stuffed sausage casings, the combination of a rotatable drum, notched pinch-bars attached to the periphery of the drum, pinch plates coacting therewith, slidable bars mounted in the drum and extending outside one end thereof, a fixed cam ring at one end of the drum engaging the projecting ends of said bars, link connections between said bars and the pinch plates; rollers mounted in the drum between the notched bars and projecting through openings in the drum casing to engage the sausage links and twist same, and means to operate the rollers, substantially as described.

9. In a machine for linking stuffed sausage casings, the combination of a rotatable drum, devices thereon for pinching the stuffed casing into links; means for operating the pinching devices, rollers mounted in the drum between adjacent pinching means and adapted to engage the sausage links and twist same; shafts journaled in the drum and extending outside thereof, a fixed gear outside the drum, gearing between the said shafts and said rollers, and gearing between said shafts and the fixed gear, substantially as described.

10. In a machine for linking stuffed sausage casings, the combination of a rotatable drum, notched pinch-bars attached to the periphery of the drum, pinch plates coacting therewith; slidable bars mounted in the drum and extending outside one end thereof, a fixed cam ring at one end of the drum engaging the projecting ends of said bars, link connections between said bars and the pinch plates; rollers mounted in the drum between the notched bars and projecting through openings in the drum casing to engage the sausage links and twist same; shafts journaled in the drum and extending outside thereof, a fixed gear outside the drum at the end opposite the cam ring, gearing between the said shafts and said rollers, and gearing between said shafts and the fixed gear, substantially as described.

In testimony whereof we have affixed our signatures.

FRITZ WILL,
AUGUST D. WILL,
CHARLES J. WILL.